(12) United States Patent
Miller et al.

(10) Patent No.: US 7,287,254 B2
(45) Date of Patent: Oct. 23, 2007

(54) AFFINITIZING THREADS IN A MULTIPROCESSOR SYSTEM

(75) Inventors: Matthew Miller, Rancho Santa Margarita, CA (US); Robert Len Walker, Mission Viejo, CA (US)

(73) Assignee: Unisys Corporation, Blue Bell, PA (US)

( * ) Notice: Subject to any disclaimer, the term of this patent is extended or adjusted under 35 U.S.C. 154(b) by 954 days.

(21) Appl. No.: 10/334,368

(22) Filed: Dec. 30, 2002

(65) Prior Publication Data

US 2004/0068730 A1 Apr. 8, 2004

Related U.S. Application Data

(63) Continuation-in-part of application No. 10/209,454, filed on Jul. 30, 2002, now Pat. No. 7,093,258.

(51) Int. Cl.
G06F 9/44 (2006.01)
G06F 9/46 (2006.01)

(52) U.S. Cl. ..................................... 718/102
(58) Field of Classification Search ......... 718/100–108
See application file for complete search history.

(56) References Cited

U.S. PATENT DOCUMENTS

| | | | |
|---|---|---|---|
| 4,099,235 A * | 7/1978 | Hoschler et al. | 718/105 |
| 5,506,987 A * | 4/1996 | Abramson et al. | 718/103 |
| 5,652,833 A * | 7/1997 | Takizawa et al. | 714/10 |
| 5,991,792 A * | 11/1999 | Nageswaran | 718/102 |
| 6,026,425 A * | 2/2000 | Suguri et al. | 718/105 |
| 6,269,391 B1 | 7/2001 | Gillespie | |
| 6,301,603 B1 | 10/2001 | Maher et al. | |
| 6,651,082 B1 * | 11/2003 | Kawase et al. | 718/105 |
| 6,658,448 B1 * | 12/2003 | Stefaniak et al. | 718/104 |
| 6,735,613 B1 * | 5/2004 | Jean-Dominique et al. | 718/104 |
| 6,769,017 B1 * | 7/2004 | Bhat et al. | 709/214 |
| 6,993,762 B1 * | 1/2006 | Pierre | 718/102 |
| 7,062,768 B2 * | 6/2006 | Kubo et al. | 718/105 |
| 2002/0165900 A1* | 11/2002 | Kubo et al. | 709/105 |
| 2003/0088608 A1* | 5/2003 | McDonald | 709/106 |
| 2004/0019891 A1* | 1/2004 | Koenen | 718/102 |

FOREIGN PATENT DOCUMENTS

EP    A-0 527 301    2/1993

(Continued)

OTHER PUBLICATIONS

Lee, Shu-Ling et al. "A Cost-Effective Scheduling with Load Balancing for Multiprocessor Systems." IEEE. 2000.*

(Continued)

*Primary Examiner*—Lewis A. Bullock, Jr.
(74) *Attorney, Agent, or Firm*—Phuong-Quan Hoang; Charles A. Johnson; Richard J. Gregson

(57) ABSTRACT

An embodiment of the invention is a technique to affinitize a thread in a multiprocessor system having N clusters of processors. A count threshold is obtained for thread affinity of the thread. A first thread count is determined. The thread is affinitized to a first cluster in the N clusters of processors according to the first thread count and the count threshold.

57 Claims, 9 Drawing Sheets

FOREIGN PATENT DOCUMENTS

WO        WO 97/06484 A     2/1997

OTHER PUBLICATIONS

Ferrari, Domenico et al. "A Load Index for Dynamic Load Balancing." IEEE. 1986.*

Severance, Charles et al. "Automatic Self-Allocating Threads on an SGI Challenge." IEEE. 1996.*

Zhou, Songnian et al. "Processor Pool-Based Scheduling for Large-Scale NUMA Multiprocessors." ACM. 1991.*

Zhou, Songnian et al. "Processor Pool-Based Scheduling for Large-Scale NUMA Multiprocessors." ACM. 1991.*

* cited by examiner

AFFINITIZING THREADS IN A MULTIPROCESSOR SYSTEM

CROSS-REFERENCE TO RELATED APPLICATIONS

This application is a continuation-in-part of the Application Ser. No. 10/209,454 entitled "Method And System For Managing Distribution Of Computer-Executable Program Threads Between Central Processing Units In A Multi-Central Processing Unit Computer System", filed on Jul. 30, 2002 now U.S. Pat. No. 7,093,528, and assigned to the same assignee. This application is related to the following patent applications: Ser. No. 10/334,369 entitled "SELECTING PROCESSOR CONFIGURATION BASED ON THREAD USAGE IN A MULTIPROCESSOR SYSTEM"; Ser. No. 10/334,341 endued "DYNAMICALLY GENERATING MASKS FOR THREAD SCHEDULING IN A MULTIPROCESSOR SYSTEM", all filed on the same date and assigned to the seine assignee as the present application, the contents of each of which are herein incorporated by reference.

BACKGROUND

1. Field of the Invention

Embodiments of the invention relates to the field of operating systems, and more specifically, to thread management.

2. Description of Related Art

Multithreading technologies have become popular in multiprocessor systems to support various levels of parallelism, to enable dynamic load balancing, to support virtual processors, and to enhance system performance. One of the challenges in designing an efficient multithreaded multiprocessor system is thread scheduling.

Existing approaches include use of the operating system (OS) to perform thread scheduling. Standard techniques employed by OS for thread scheduling in a multiprocessor system have a number of drawbacks. First, the OS does not normally take advantage of various levels of physical locality of resources; therefore, thread scheduling leads to inefficient thread distribution among the processors. Second, the OS typically employ priority-based or time slice-based scheduling policies which tend to degrade system performance due to high thread switching time. Third, the OS does not normally provide the flexibility in managing thread affinity and control of affinity granularity. The user does not have control over the scheduling management.

SUMMARY OF INVENTION

An embodiment of the invention is a technique to affinitize a thread in a multiprocessor system having N clusters of processors. A count threshold is obtained for thread affinity of the thread. A first thread count is determined. The thread is affinitized to a first cluster in the N clusters of processors according to the first thread count and the count threshold.

BRIEF DESCRIPTION OF THE DRAWINGS

The invention may best be understood by referring to the following description and accompanying drawings that are used to illustrate embodiments of the invention. In the drawings.

DESCRIPTION

An embodiment of the invention is a technique to affinitize a thread in a multiprocessor system having N clusters of processors. A count threshold is obtained for thread affinity of the thread. A first thread count is determined. A thread is then affinitized to a first cluster in the N clusters of processors according to the first thread count and the count threshold. In one embodiment, the thread affinitization is static and is controlled by the count threshold. In another embodiment, the thread affinization is dynamic. The count threshold is used to guide the distribution of threads among the clusters of processors as a function of the count threshold, the thread turn-over rate, and the number of active threads.

In the following description, numerous specific details are set forth. However, it is understood that embodiments of the invention may be practiced without these specific details. In other instances, well-known circuits, structures, and techniques have not been shown in order not to obscure the understanding of this description.

Figure 1A:
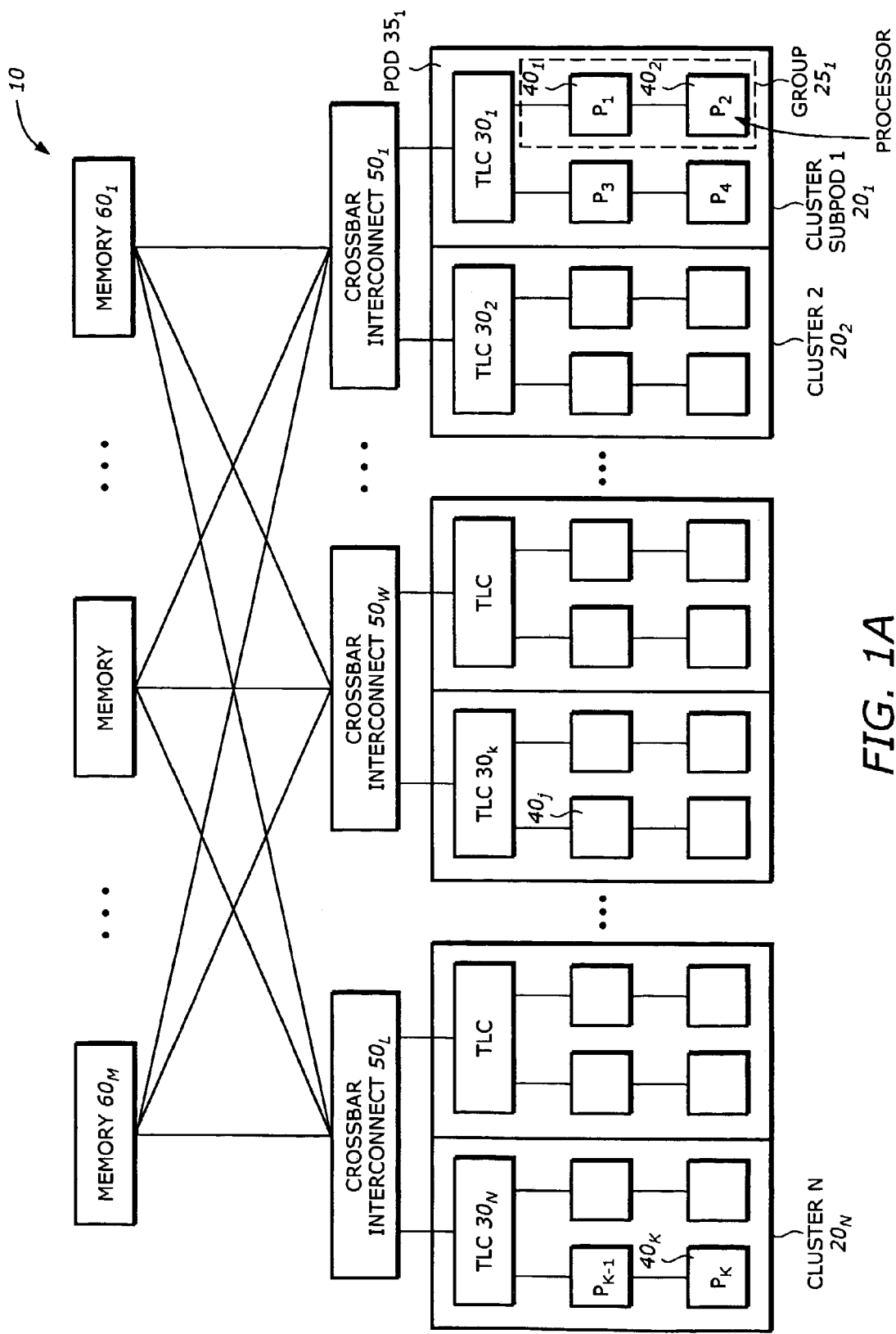
FIG. 1A is a diagram illustrating a system in which one embodiment of the invention can be practiced.

FIG. 1A is a diagram illustrating a system 10 in which one embodiment of the invention can be practiced. The system 10 includes N clusters of processors $20_1$ to $20_N$, L crossbar interconnects $50_1$ to $50_L$ and M memories $60_1$ to $60_M$. The system 10 is referred to as a cellular multiprocessor (CMP) system.

Each of the clusters of processors $20_1$ to $20_N$ forms a subpod and includes a number of processor subsystems $40_j$'s and a third level cache (TLC) $30_k$'s. The processor subsystems $40_j$'s within each cluster $20_i$ further form into groups connected together via a bus structure. Each group is connected to a TLC $30_k$. For example, processor subsystems $40_1$ and $40_2$ form a group $25_1$. It is contemplated that the number of processor subsystems $40_j$'s in a group and the number of groups in a cluster may be any suitable number according to the configuration. As illustrated in FIG. 1A, the processor subsystems $40_j$'s form into two groups and each group consists of two processor subsystems. Each of the TLC $30_k$'s provides another level of cache memory in addition to the second level (L2) and first level (L1) caches in each of the processor subsystems $40_j$'s. Each of the TLC $30_k$'s provides a larger cache memory than the L2 and L1 caches of the corresponding processor subsystems to improve performance by allowing the processors within a subpod or group to share cached information. The TLC $30_k$'s may be implemented by any suitable memory technologies, including static random access memory (SRAM) and dynamic random access memory (DRAM). It is contemplated that a cache coherence protocol is maintained throughout the system 10.

Each of the crossbar interconnects $50_1$ to $50_L$ is a crossbar switch connected to the memories $60_1$ to $60_M$ and a number of clusters of processors. The clusters of processors that are connected to each crossbar interconnect form a pod. For example, the subpods or clusters $20_1$ and $20_2$ form a pod $35_1$. The crossbar interconnect $50_m$'s fully connects any one of memories $60_1$ to $60_M$ to any one of the clusters of processors in the pod that it is connected to. Each of the memories $60_1$ to $60_M$ is accessible to any of the processor subsystems $40_j$'s via the crossbar interconnects $50_m$'s. The memories may be implemented by any suitable memory technologies including SRAM and DRAM.

The configuration of the CMP system 10 provides a flexible mechanism for thread scheduling and thread affinity management. A thread is a unit of program or code. A thread may be created by an application, a virtual machine, or the operating system. Thread affinitization is a process to assign a thread to a processor or a cluster of processors. When a thread is affinitized to a cluster of processors, it is executed within the processors in that cluster. Thread affinitization is a main task in thread scheduling. The thread affinity granularity refers to the degree of clustering of the processor subsystems $40_j$'s in thread affinity management. The granularity may be at the processor level, at the bus level (e.g., two processors connected to the TLC via a bus), at the subpod level (e.g., four processors connected to the TLC), at the pod level (e.g., eight processors connected to a common crossbar switch), or at any number of processors. The thread granularity may be statically provided via user's input or dynamically changed according to the system behavior.

Figure 1B:
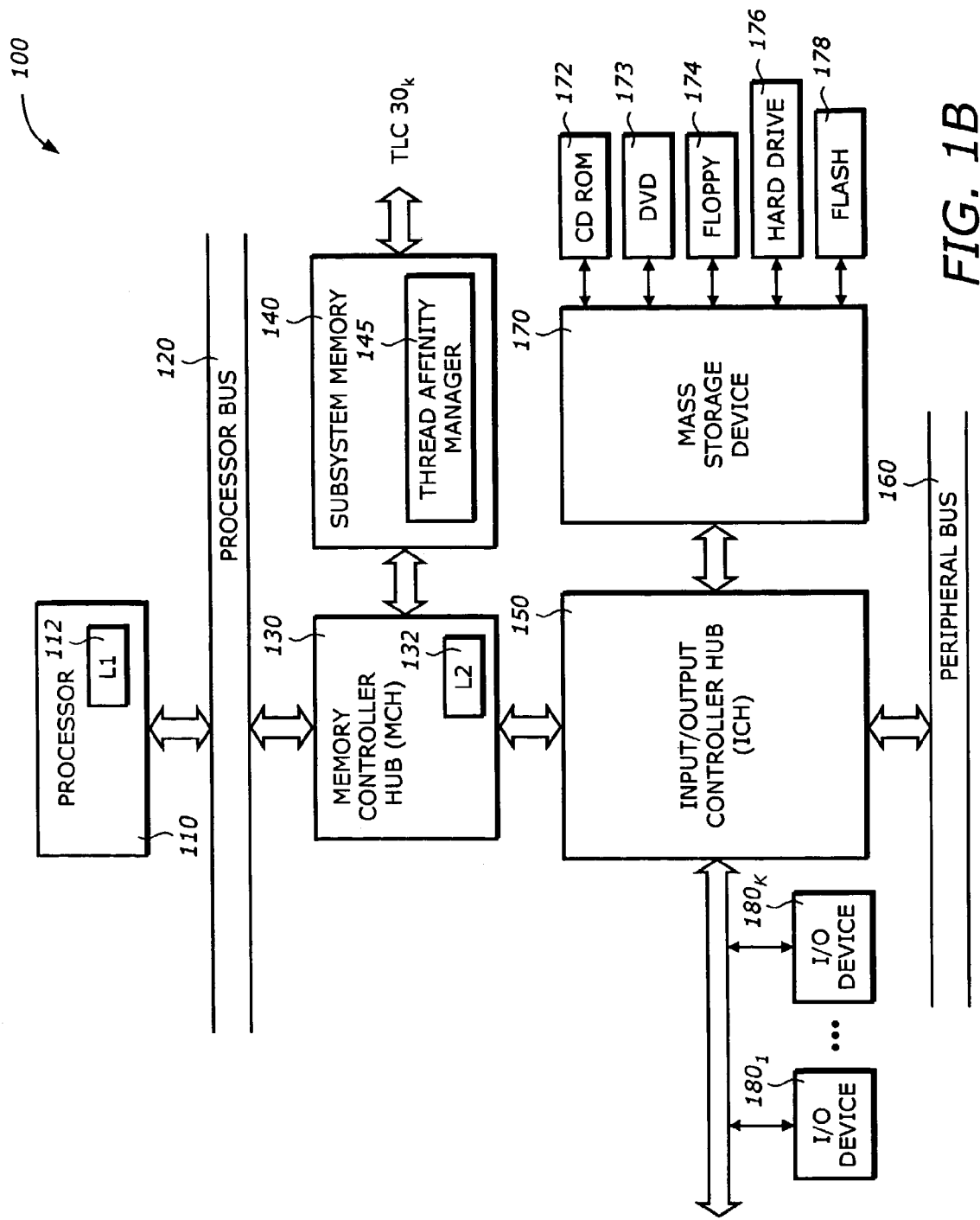
FIG. 1B is a diagram illustrating a processor subsystem according to one embodiment of the invention.

FIG. 1B is a diagram illustrating a processor subsystem 40 in which one embodiment of the invention can be practiced. The processor subsystem 40 includes a processor 110, a processor bus 120, a memory control hub (MCH) 130, a subsystem memory 140, an input/output control hub (ICH) 150, a peripheral bus 160, a mass storage device 170, and input/output devices $180_1$ to $180_K$. Note that the processor subsystem 40 may include more or less elements than these elements. The processor subsystem 40 may also be used to emulate or simulate the CMP using the thread affinity management technique described in the following.

The processor 110 represents a central processing unit of any type of architecture, such as embedded processors, mobile processors, micro-controllers, digital signal processors, superscalar computers, vector processors, single instruction multiple data (SIMD) computers, complex instruction set computers (CISC), reduced instruction set computers (RISC), very long instruction word (VLIW), or hybrid architecture. The processor 110 typically includes a first level (L1) cache 112.

The processor bus 120 provides interface signals to allow the processor 110 to communicate with other processors or devices, e.g., the MCH 130. The processor bus 120 may support a uni-processor or multiprocessor configuration. The processor bus 120 may be parallel, sequential, pipelined, asynchronous, synchronous, or any combination thereof.

The MCH 130 provides control and configuration of memory and input/output devices such as a second level cache (L2) 132, the system memory 140, the ICH 150, and the TLC $30_K$. The MCH 130 may be integrated into a chipset that integrates multiple functionalities such as the isolated execution mode, host-to-peripheral bus interface, memory control. The MCH 130 interfaces to the peripheral bus 160. For clarity, not all the peripheral buses are shown. It is contemplated that the subsystem 40 may also include peripheral buses such as Peripheral Component Interconnect (PCI), accelerated graphics port (AGP), Industry Standard Architecture (ISA) bus, and Universal Serial Bus (USB), etc.

The subsystem memory 140 stores system code and data The subsystem memory 140 is typically implemented with dynamic random access memory (DRAM) or static random access memory (SRAM). The subsystem memory may include program code or code segments implementing one embodiment of the invention. The subsystem memory includes a thread affinity manager 145. Any one of the elements of the thread affinity manager 145 may be implemented by hardware, software, firmware, microcode, or any combination thereof. The subsystem memory 140 may also include other programs or data which are not shown, such as an operating system. The thread affinity manager 145 contains program code that, when executed by the processor 110, causes the processor 110 to perform operations as described below.

The ICH 150 has a number of functionalities that are designed to support I/O functions. The ICH 150 may also be integrated into a chipset together or separate from the MCH 130 to perform I/O functions. The ICH 150 may include a number of interface and I/O functions such as PCI bus interface to interface to the peripheral bus 160, processor interface, interrupt controller, direct memory access (DMA) controller, power management logic, timer, system management bus (SMBus), universal serial bus (USB) interface, mass storage interface, low pin count (LPC) interface, etc.

The mass storage device 170 stores archive information such as code, programs, files, data, applications, and operating systems. The mass storage device 170 may include compact disk (CD) ROM 172, a digital video/versatile disc (DVD) 173, floppy drive 174, hard drive 176, flash memory 178, and any other magnetic or optic storage devices. The mass storage device 170 provides a mechanism to read machine-accessible media The machine-accessible media may contain computer readable program code to perform tasks as described in the following.

The I/O devices $180_1$ to $180_K$ may include any I/O devices to perform I/O functions. Examples of I/O devices $180_1$ to $180_K$ include controller for input devices (e.g., keyboard, mouse, trackball, pointing device), media card (e.g., audio, video, graphics), network card, and any other peripheral controllers.

Elements of one embodiment of the invention may be implemented by hardware, firmware, software or any combination thereof. The term hardware generally refers to an element having a physical structure such as electronic, electromagnetic, optical, electro-optical, mechanical, electromechanical parts, etc. The term software generally refers to a logical structure, a method, a procedure, a program, a routine, a process, an algorithm, a formula, a function, an expression, etc. The term firmware generally refers to a logical structure, a method, a procedure, a program, a routine, a process, an algorithm, a formula, a function, an expression, etc that is implemented or embodied in a hardware structure (e.g., flash memory, ROM, EROM). Examples of firmware may include microcode, writable control store, microprogrammed structure. When implemented in software or firmware, the elements of an embodiment of the present invention are essentially the code segments to perform the necessary tasks. The software/firmware may include the actual code to carry out the operations described in one embodiment of the invention, or code that emulates or simulates the operations. The program or code segments can be stored in a processor or machine accessible medium or transmitted by a computer data signal embodied in a carrier wave, or a signal modulated by a carrier, over a transmission medium. The "processor readable or accessible medium" or "machine readable or accessible medium" may include any medium that can store, transmit, or transfer information. Examples of the processor readable or machine accessible medium include an electronic circuit, a semiconductor memory device, a read only memory (ROM), a flash memory, an erasable ROM (EROM), a floppy diskette, a compact disk (CD) ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc. The machine accessible medium may be embodied in an article of manufacture. The machine accessible medium may include data that, when accessed by a machine, cause the machine to perform the operations described in the following. The machine accessible medium may also include program code embedded therein. The program code may include machine readable code to perform the operations described in the following. The term "data" here refers to any type of information that is encoded for machine-readable purposes. Therefore, it may include program, code, data, file, etc.

All or part of an embodiment of the invention may be implemented by hardware, software, or firmware, or any combination thereof. The hardware, software, or firmware element may have several modules coupled to one another. A hardware module is coupled to another module by mechanical, electrical, optical, electromagnetic or any physical connections. A software module is coupled to another module by a function, procedure, method, subprogram, or subroutine call, a jump, a link, a parameter, variable, and argument passing, a function return, etc. A software module is coupled to another module to receive variables, parameters, arguments, pointers, etc. and/or to generate or pass results, updated variables, pointers, etc. A firmware module is coupled to another module by any combination of hardware and software coupling methods above. A hardware, software, or firmware module may be coupled to any one of another hardware, software, or firmware module. A module may also be a software driver or interface to interact with the operating system running on the platform. A module may also be a hardware driver to configure, set up, initialize, send and receive data to and from a hardware device. An apparatus may include any combination of hardware, software, and firmware modules.

One embodiment of the invention may be described as a process which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed. A process may correspond to a method, a program, a procedure, a method of manufacturing or fabrication, etc.

Figure 2:
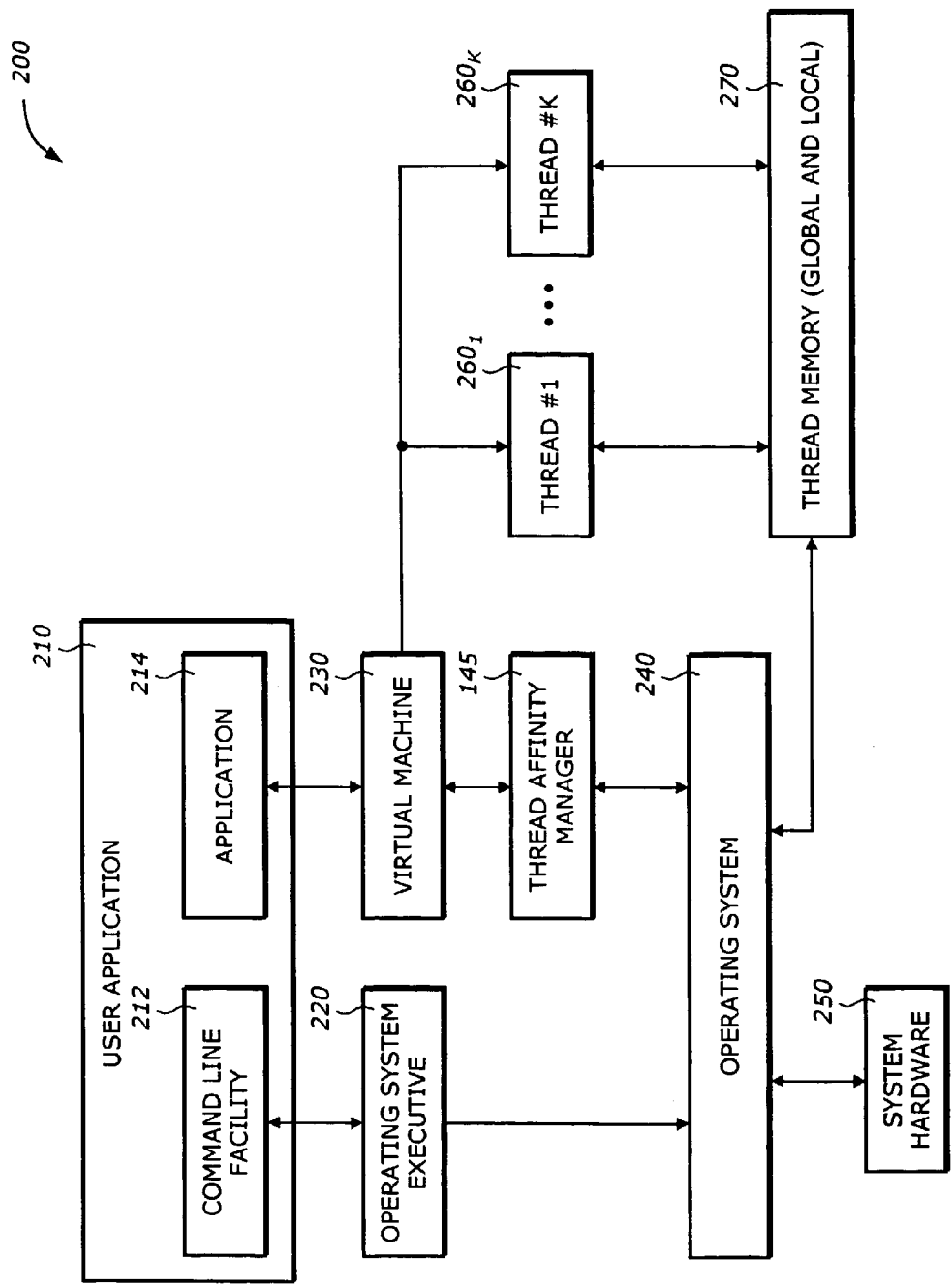
FIG. 2 is a diagram illustrating a software architecture according to one embodiment of the invention.

FIG. 2 is a diagram illustrating a software architecture 200 according to one embodiment of the invention. The software architecture 200 includes a user application 210, an operating system (OS) executive 220, a virtual machine 230, the thread affinity manager 145, an operating system 240, system hardware 250, K threads $260_1$ to $260_K$, and thread memory 270.

The user application 210 is a software layer that is interfaced to the user to allow the user to run, launch, and invoke applications. The user application 210 includes a command line facility 212 and an application 214. The command line facility 212 provides a mechanism to allow the user to control, manage, and configure a particular application program. The command line facility 212 may allow the user to request to launch, execute, or invoke the application 214 by issuing a command line. The command line facility 212 may include functional modules to facilitate command line editing, buffering, or manipulating. The command line may also include application parameters such as thread affinity management, count threshold, thread affinity granularity, argument list, etc. By using the command line facility 212, the user can have control over the thread affinity management such as setting thread affinity flag, selecting affinity granularity, and selecting the thread count threshold. The application 214 is a user program to perform particular tasks within the system 10. Examples of the application 214 may include a graphics program, a server interface program, a database program, or any program that may utilize the multiprocessor architecture provided by the system 10.

The OS executive 220 is a software component that interfaces to the command line facility 220 and the OS 240. The OS executive 220 may be a shell or a command interpreter that interprets the command line as generated by the command line facility 220 and passes the interpreted command line to the OS 240.

The virtual machine 230 provides an environment for executing the application 214. The virtual machine simulates the hardware platform on which the application is run. The virtual machine may include an interpreter, system calls, a library of functions, thread management functions, a garbage collector, and other interfaces. Examples of the virtual machine 230 include a parallel virtual machine (PVM), a Microsoft™ virtual machine, and a Java™ virtual machine (JVM).

The thread affinity manager 145 manages thread affinity via interfaces to the virtual machine 230 and the OS 240. The thread affinity manager 145 may perform the following tasks: creating an affinity mask, updating the affinity mask, selecting affinity granularity, affecting thread scheduling, assigning threads to clusters of processors. One of the main functions of the thread affinity manager 145 is to select a cluster of processors to assign a thread to.

The OS 240 performs typical OS functions including process management, protection, scheduling, hardware interfacing, memory management, input/output management, etc. The OS 240 interacts with the system hardware 250 and the memory 270. The system hardware 250 may includes I/O devices, peripheral devices, peripheral controllers, network devices, memory elements, etc. In one embodiment, the OS 240 is one of a Windows™ OS, a Windows DataCenter™, a UNIX OS, a Linux OS, and any other suitable OS for multiprocessor systems.

The threads $260_1$ to $260_K$ are program threads created in user applications such as the application 214. The threads $260_1$ to $260_K$ may also include system threads or kernel threads that are created and run on behalf of the OS 240 or the virtual machine 230. Each of the threads $210_1$ to $260_K$ maintains its own local variables and local resources such as program counter and stack. They also share common global variables and memory. The threads interface to the thread memory 270 for accessing the local and global variables.

The thread memory 270 may be any combination of the local caches, local memories, the associated TLC, and the global memories $60_1$ to $60_M$ shown in FIG. 1A.

There are two techniques to affinitize threads: a static technique and a dynamic or adaptive technique. In the first technique, threads are affinitized to clusters of processors statically in a round robin manner. Each cluster of processors is responsible for managing, executing, or maintaining a maximum number of threads. This maximum number of threads is provided by the count threshold. When this threshold is reached, a new thread is affinitized to the next cluster selected as one that is in proximity to the current cluster. When the last cluster is reached, the next cluster is the first cluster in the sequence and the process is repeated. This technique is suitable for applications where the thread turn-over rate is low. The thread turn-over rate is the rate that measures the degree of volatility of thread creation and termination. Typically, a high turn-over rate indicates that many threads are terminated and created within a short time period. When this condition occurs, the static technique tends to create unbalanced thread distribution where threads tend to move across all the available clusters of processors. The second technique helps reduce this problem.

In the second technique, the selection of the clusters of processors for affinitization depends on the number of active threads and the count threshold. The count threshold, however, is not used as the maximum number of threads affinitized to a cluster of processors. It is used to guide the thread distribution dynamically. The number of threads affinitized to each cluster of processors may not be limited by the count threshold. It may exceed the count threshold. The thread distribution is, therefore, more adaptive to the dynamic behavior of the overall system. In this technique, an index is computed to point to the cluster of processors to which the thread will be affinitized to. This index is determined by taking a ratio between the number of active threads and the count threshold and then applying the modulo-N operation on this ratio to ensure that the index is within a range of 1 to N, where N is the total number of cluster configurations for the thread affinity.

Let $t_T$, $t_S$, and $t_C$ be the total thread count, the system thread count, and the application thread count. The total thread count $t_T$ is the total number of threads for the entire process. The system thread count $t_S$ is the number of threads for system threads or non-application threads. The first, or application, thread count $t_C$ is the number of threads for the application. The first thread count is therefore computed as:

$$t_C = t_T - t_S \quad (1)$$

The index is determined by first computing a ratio as a function of the first thread count $t_C$ and the count threshold $t_x$ and then converting the ratio into the index such that the index is within a range of 1 and N. For example, the index may be computed as:

$$\text{index} = [(t_C + \alpha)/t_x] \% N + 1 \quad (2)$$

where $t_x$ is the count threshold, $\alpha$ is a constant, and N is the total number of cluster configurations for thread affinity or the total number of affinity masks to choose from. Note that in equation (2), $t_C$ and $t_x$ are integers and the ratio $(t_C + \alpha)/t_x$ is an integer division. The constant $\alpha$ may be selected to be equal to −1, 0, or +1. The index therefore ranges from 1 to N. Alternatively, the index may also be obtained from a look-up table. The contents of the look-up table are the index values and the pointer is the $t_C$ value reduced by some modulo function.

It is noted that when the thread turn-over rate is low, the second technique provides thread distribution in much the same way as the first technique. In other words, the thread distribution may be reduced to a distribution similar to a round robin distribution. In addition, the thread distribution is not deterministic and may accommodate thread creation and termination profiles that follow some probabilistic distribution. In the following description, the first technique is explained in FIGS. 3 and 4 and the second technique is explained in FIGS. 3, 6, 7, and 8.

Figure 3:
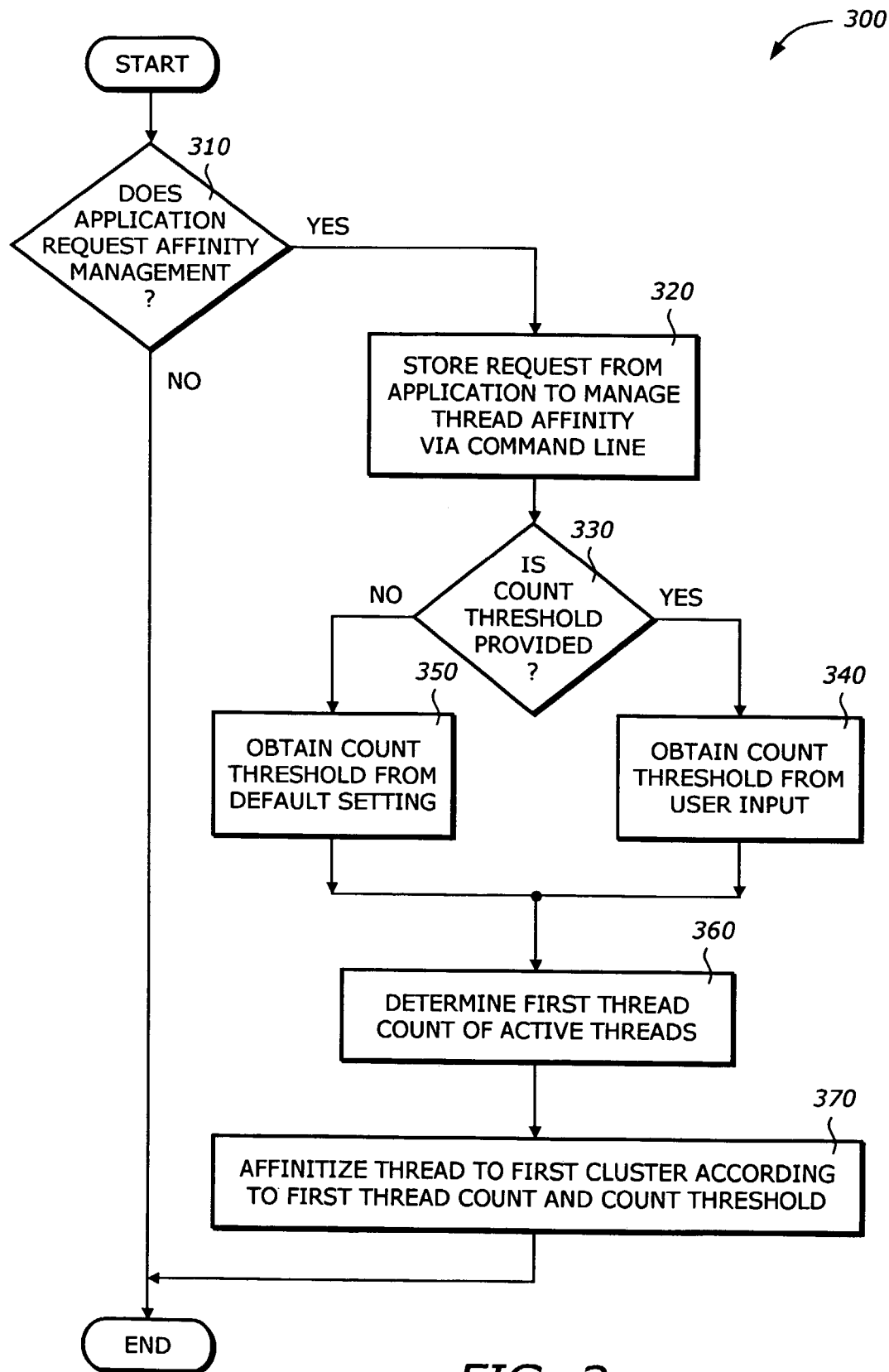
FIG. 3 is a flowchart illustrating a process to manage thread affinity according to one embodiment of the invention.

FIG. 3 is a flowchart illustrating a process 300 to manage thread affinity according to one embodiment of the invention.

Upon START, the process 300 determines if the application request for thread affinity management (Block 310). This may be accomplished by receiving and interpreting a command line provided by the user. If not, the process 300 is terminated. Otherwise, the process 300 stores the request including the command line parameters (Block 320). The command line parameters may include affinity granularity, count threshold, operating mode, etc. This may include setting a flag indicating a request for thread affinity management has been made. Next, the process 300 determines if the count threshold is provided (Block 330). The count threshold is a threshold value for the number of threads to be assigned or affinitized to a cluster of processors. The count threshold may be provided as part of the command line arguments or parameters. In one embodiment, this count threshold is used statically to control a degree of multi-threading for the clusters of processors. In another embodiment, this count threshold serves as a guiding parameter for adjusting the degree of multithreading according to system thread usage, thread turn-over rate, and other system behaviors.

If a count threshold is provided, the process 300 obtains this count threshold from the user input (e.g., command line parameters) and stores it for later use (Block 340) and proceeds to Block 360. Otherwise, the process 300 obtains the count threshold from a default setting (Block 350) and proceeds to Block 360. The default setting may be predetermined as a fixed value or a value which is dependent on system configuration or other factors such as application type, application history of execution, or previously used threshold value.

In block 360, the process 300 determines a first thread count of the active threads in the multiprocessor system (Block 360). The active threads include those threads that are currently running. Next, the process 300 affinitizes the thread to a first cluster of processors according to the first thread count and the count threshold (Block 370) and is then terminated.

Figure 4:
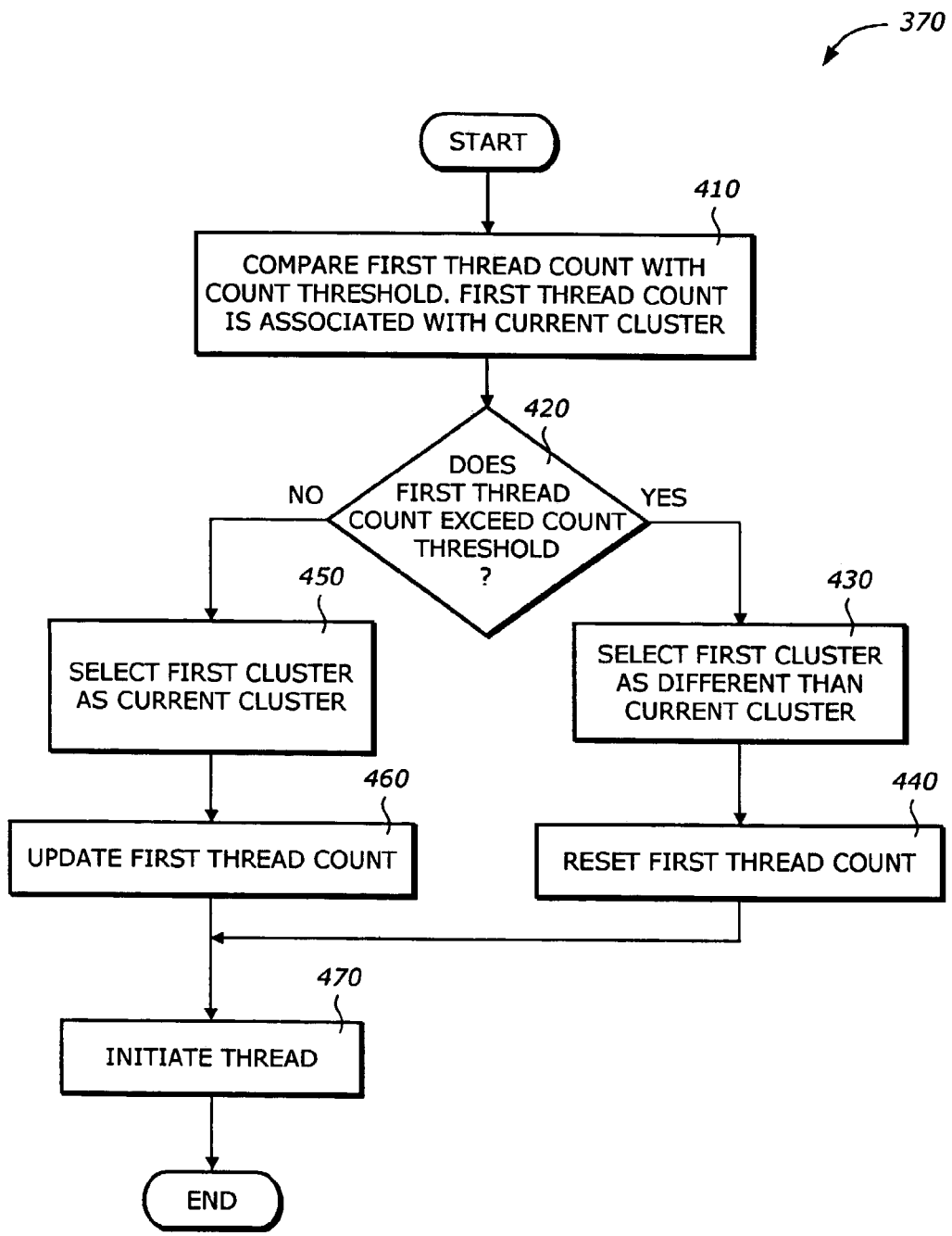
FIG. 4 is a flowchart illustrating a process to affinitize threads according to one embodiment of the invention.

FIG. 4 is a flowchart illustrating a process 370 to affinitize threads according to one embodiment of the invention. This process 370 represents the embodiment that uses the first technique as discussed above.

Upon START, the process 370 compares the first thread count with the count threshold (Block 410). The first thread count is associated with the currently selected cluster of processors. Next, the process 370 determines if the thread count exceeds the count threshold (Block 420). If so, the process 370 selects the first cluster of processors to assign the thread to as a next cluster that is different from the current cluster (Block 430). Typically the next cluster is the cluster that is in proximity to the current cluster as configured by an affinity mask. By selecting the next cluster in close proximity to the current cluster, thread locality may be maintained so that performance is improved. Then, the process 370 resets the first thread count (Block 440) and proceeds to initiate the thread (Block 470). If the first thread count does not exceed the count threshold, the process 370 selects the first cluster of processors to assign the thread to as the current cluster (Block 450). Next, the process 370 updates the thread count (Block 460). This can be done by incrementing the thread count and saves the incremented thread count for later retrieval. Then, the process 370 initiates the thread (Block 470) and is then terminated.

Figure 5:
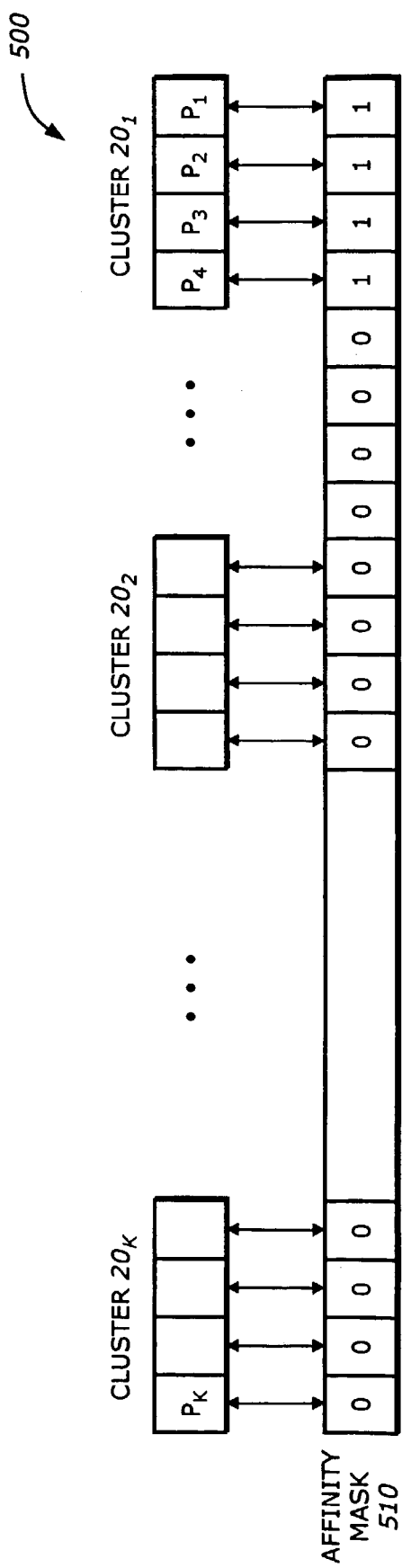
FIG. 5 is a diagram illustrating an affinity mask according to one embodiment of the invention.

FIG. 5 is a diagram illustrating an affinity mask configuration 500 according to one embodiment of the invention. The affinity mask configuration 500 includes an affinity mask 510 and the corresponding processors $20_1$ to $20_k$.

The affinity mask 510 is a logical representation of the availability of processors for affinitization. Typically, the affinity mask 510 includes a number of bits corresponding to the number of processors in the system 10. Each bit corresponds to a processor. For a N-processor multiprocessor system, there are N bits in the affinity mask 510. An affinity mask bit is set or reset to indicate if the corresponding processor is available for thread assignment. For example, in the illustrative example shown in FIG. 5, when an affinity mask bit is set to logical zero, it indicates that the corresponding processor is not available for affinitization. In the affinity mask 510 shown in FIG. 5, bits 0 through 3 are set while the remaining bits are reset, indicating that processors P1 through P4 in the cluster $20_1$ are available for affinitization, and the remaining processors are not available for affinitization.

Typically, for efficient usage, the affinity mask 510 is processed as a group of bits corresponding to the size of the clusters of processors. The granularity of the thread affinity is determined in advance, either by user's input via the command line or by a dynamic process. This granularity dictates the size of the clusters of processors. For example, the granularity may be one processor, a group of processors connected to the TLC via a bus, a subpod, or a pod. The affinity mask 510 may also be used in any combination of granularities.

Figure 6:
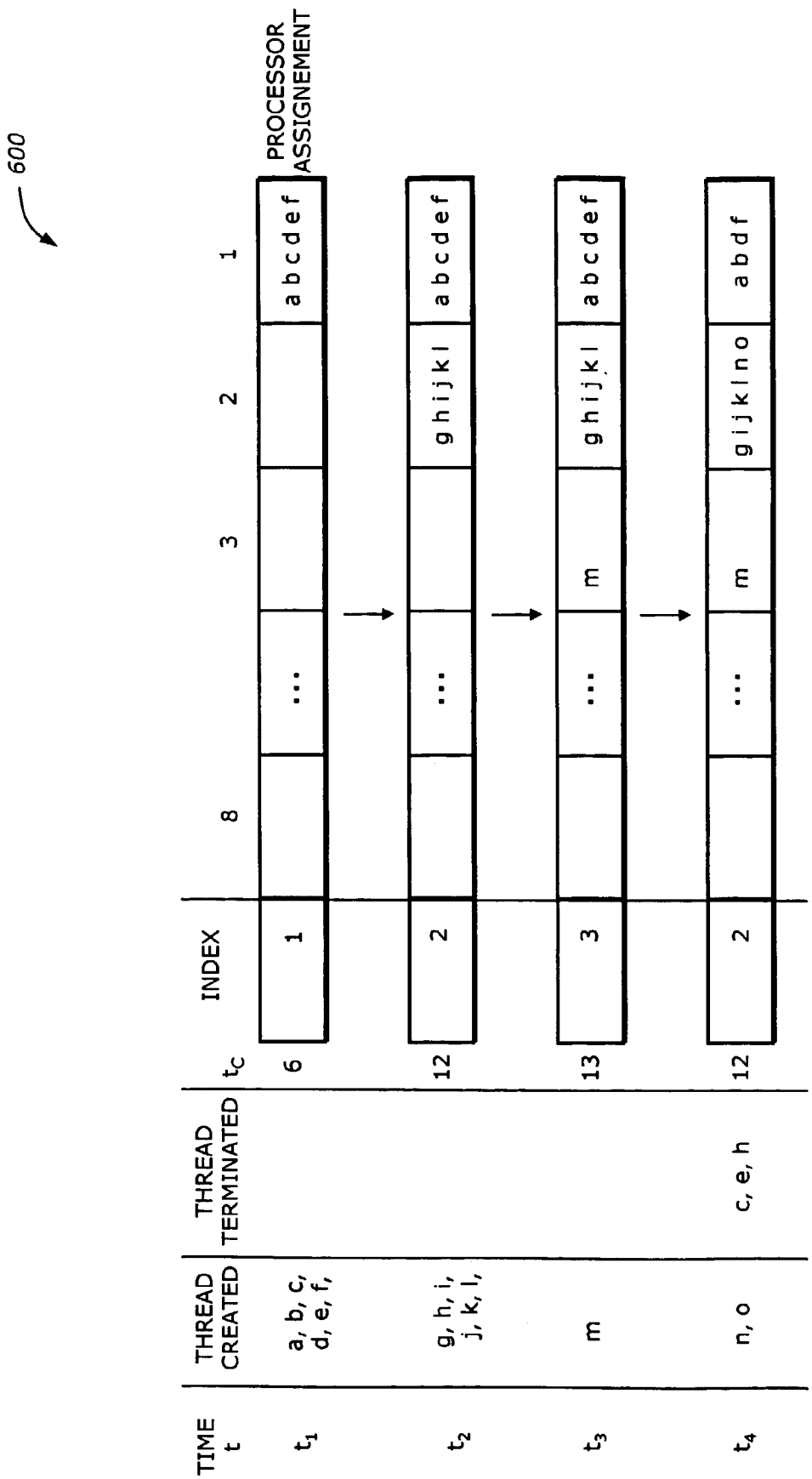
FIG. 6 is a diagram illustrating a thread scheduling sequence according to one embodiment of the invention.

FIG. 6 is a diagram illustrating a thread scheduling sequence 600 according to one embodiment of the invention. This thread scheduling sequence is an example of using the second technique. The thread scheduling sequence 600 shows contents of the processor assignment at successive times when threads are created or terminated. The processor assignment is shown to have N groups of bits corresponding to N clusters of processors. Each cluster corresponds to the same number of processors.

In this illustrative example, the count threshold is $t_x=6$ and N=8. The system thread count is assumed to be constant so that the first thread count $t_C$ is equal to the number of threads currently active in the application. The index is computed using equation (2) with $\alpha=-1$.

At time $t=t_1$, six threads a, b, c, d, e, and f are created and no thread is terminated. The first thread count $t_C=6$. The index value is:

index=[(6−1)/6]% N+1=1

Therefore, the six threads a, b, c, d, e, and f are affinitized to cluster 1.

At time $t=t_2$, six more threads g, h, i, j, k, and l are created and no thread is terminated. The first thread count $t_C=12$. The index value is:

index=[(12−1)/6]% N+1=2

Therefore, the six threads g, h, i, j, k, and 1 are affinitized to cluster 2.

At time $t=t_3$, one more thread m is created and no thread is terminated. The first thread count $t_C=13$. The index value is:

index=[(13−1)/6]% N+1=3

Therefore, the thread m is affinitized to cluster 3.

At time $t=t_4$, two more threads n and o are created and threads c, e and h are terminated. The first thread count is tc=12. The index value is:

index=[(12−1)/6]% N+1=2

Therefore, the threads n and o are affinitized to cluster 2.

At time $t=t_4$, it is seen that the number of threads affinitized to cluster 2 is 7 and the number of threads affinitized to cluster 1 is 4. The count threshold $t_x$, therefore, does not act as a hard threshold that sets the maximum number of threads for each cluster. The count threshold $t_x$ serves to adjust the thread affinitization dynamically. The actual thread count threshold is dynamically adjusted as a function of the original count threshold $t_x$, the thread turnover rate, and the number of active threads $t_C$. The actual count threshold may be increased. In other words, the number of threads affinitized to a cluster may be more than the original count threshold $t_x$. This automatic adjustment helps improving performance by maintaining thread locality and efficient thread distribution among the clusters of processors.

Figure 7:
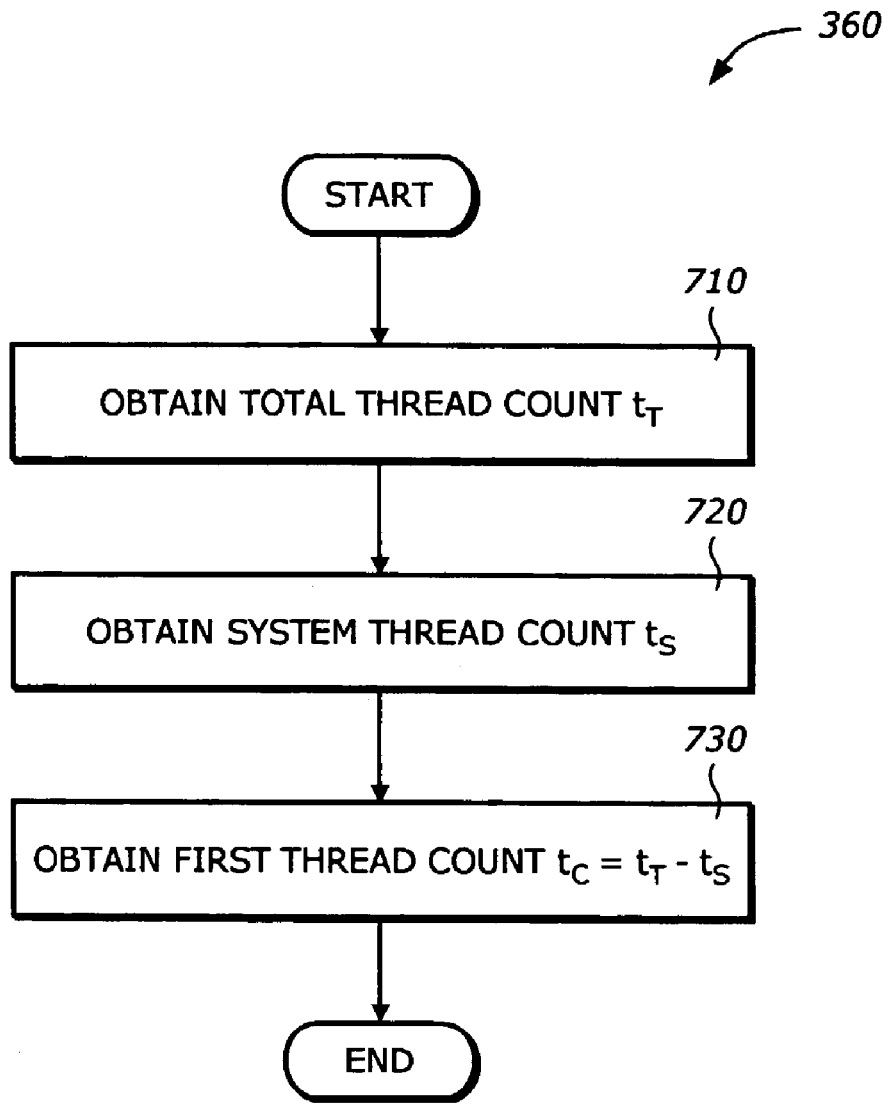
FIG. 7 is a flowchart illustrating a process to determined thread count according to one embodiment of the invention.

FIG. 7 is a flowchart illustrating a process 360 to determined the first thread count according to one embodiment of the invention.

Upon START, the process 360 obtains the total thread count $t_T$ as the total number of threads in the entire system (Block 710). Next, the process 360 obtains the system thread count $t_S$ (Block 720). The system thread count $t_S$ is the number of threads that are created and maintained by the system, either by the OS, the virtual machine, or both. These threads are typically affinitized to a dedicated processor or cluster of processors.

Next, the process 360 obtains the first thread count $t_C$ as the difference between the total thread count and the system thread count, or $t_C=t_T-t_S$ as shown in equation (1) (Block 730). If the system thread count $t_S$ is constant, the first thread count $t_C$ may be obtained by incrementing the first thread count each time a new thread is created and decrementing the first thread count each time a thread is terminated. Then, the process 360 is terminated.

Figure 8:
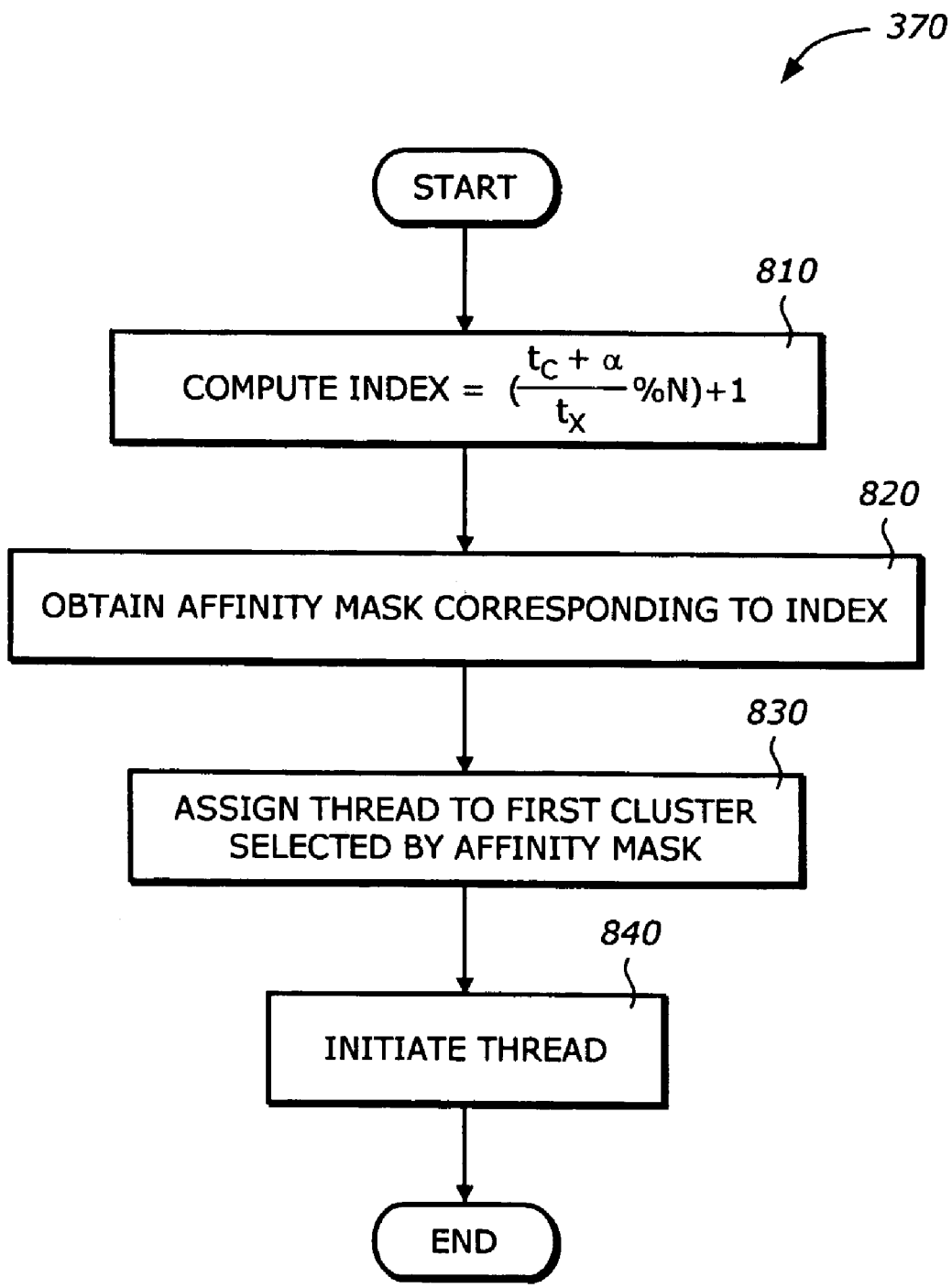
FIG. 8 is a flowchart illustrating a process to affinitize threads according to one embodiment of the invention.

FIG. 8 is a flowchart illustrating a process 370 to affinitize threads according to one embodiment of the invention. The process 370 shown in FIG. 8 is an illustration of the thread affinitization of the second technique.

Upon START, the process 370 computes the index as a function of the first thread count, the count threshold, and the total number of clusters of processors available for affinitization (Block 810). For example, index=$[(t_C-1)/t_x]$ % N+1 as shown in equation (2), where % is a modulo function, $t_C$ is the first thread count, $t_x$ is the count threshold, and N is the number of clusters of processors. The modulo function ensures that the index value is within a range from 1 to N. Alternatively, the index may be obtained from a look-up table where the affinity has been determined in advance.

Then, the process 370 obtains an affinity mask corresponding to the index (Block 820). The affinity mask is used to select the proper processors to which the thread is affinitized. Next, the process 370 affinitizes or assigns the thread to the first cluster as selected by the affinity mask (Block 830). Then, the process 370 initiates the thread (Block 840) and is then terminated.

While the invention has been described in terms of several embodiments, those of ordinary skill in the art will recognize that the invention is not limited to the embodiments described, but can be practiced with modification and alteration within the spirit and scope of the appended claims. The description is thus to be regarded as illustrative instead of limiting.

What is claimed is:

1. A method comprising:
   obtaining a count threshold for thread affinity of a thread in a multiprocessor system having N clusters of processors;
   determining a first thread count; and
   affinitizing the thread to a first cluster in the N clusters of processors according to the first thread count and the count threshold, the count threshold corresponding to number of threads assigned to the first cluster;
   wherein determining the first thread count comprises:
   determining the first thread count as a difference between a total thread count and a system thread count.

2. The method of claim 1 wherein affinitizing comprises:
   comparing the first thread count with the count threshold, the first thread count being associated with a current cluster;
   selecting the first cluster being different than the current cluster if the first thread count exceeds the count threshold; and
   selecting the first cluster being the current cluster if the first thread count does not exceed the thread count threshold.

3. The method of claim 2 wherein affinitizing further comprises:
   updating the first thread count.

4. The method of claim 2 wherein affinitizing further comprises:
   resetting the first thread count if the first thread count exceeds the count threshold.

5. The method of claim 1 wherein affinitizing comprises:
   determining an index pointing to the first cluster using the first thread count and the count threshold; and
   assigning the thread to the first cluster corresponding to the index.

6. The method of claim 5 wherein determining an index comprises:
   computing a ratio as a function of the first thread count and the count threshold; and
   converting the ratio into the index such that the index is within a range between 1 and N.

7. The method of claim 6, wherein computing a ratio comprises:
   adding a constant to the first thread count to produce a sum; and
   dividing the sum by the count threshold to produce the ratio.

8. The method of claim 6 wherein converting the ratio comprises:
   converting the ratio into the index using one of a modulo function and a look-up table.

9. The method of claim 1 wherein obtaining the count threshold comprises:
   obtaining a count threshold as one of a user input and a default setting.

10. The method of claim 1 further comprising:
    receiving a request from an application to manage the thread affinity.

11. The method of claim 10 wherein receiving a request comprises:
    receiving a request from an application to manage thread affinity, the request specifying an affinity granularity.

12. The method of claim 10 wherein receiving the request comprises:
    receiving the request from the application to manage thread affinity via a Java™ virtual machine (JVM) command line.

13. The method of claim 1 wherein obtaining a count threshold comprises:
    obtaining a count threshold for thread affinity of a thread in a multiprocessor system having N clusters of processors, the N clusters of processors operating under an operating system, the thread being created by a virtual machine.

14. The method of claim 1 wherein obtaining a count threshold comprises:
    obtaining a count threshold for thread affinity of a thread in a cellular multiprocessor system having N clusters of processors.

15. The method of claim 1 wherein obtaining a count threshold comprises:
    obtaining a count threshold for thread affinity of a thread in a multiprocessor system having N clusters of processors, the N clusters of processors operating under an operating system, the thread being created by a Java™ virtual machine (JVM).

16. The method of claim 1 wherein obtaining a count threshold comprises:
    obtaining a count threshold for thread affinity of a thread in a multiprocessor system having N clusters of processors, the N clusters of processors operating under a Windows™ operating system, the thread being created by a virtual machine.

17. The method of claim 1 wherein obtaining a count threshold comprises:
    obtaining a count threshold for thread affinity of a thread in a multiprocessor system having N clusters of processors, each of the N clusters of processors having at least one processor.

18. The method of claim 1 wherein affinitizing comprises:
    affinitizing a Java™ thread to a first cluster in the N clusters of processors according to the first thread count and the count threshold.

19. A method comprising:
    obtaining a count threshold for thread affinity of a thread in a multiprocessor system having N clusters of processors;
    determining a first thread count; and
    affinitizing the thread to a first cluster in the N clusters of processors according to the first thread count and the count threshold, the count threshold corresponding to number of threads assigned to the first cluster;
    wherein affinitizing comprises:
    creating an affinity mask to correspond to available clusters of processors; and
    assigning the thread to the first cluster in the N clusters of processors using the affinity mask according to the first thread count and the count threshold.

20. An article of manufacture comprising:
    a machine-accessible medium including data that, when accessed by a machine, causes the machine to perform operations comprising:
    obtaining a count threshold for thread affinity of a thread in a multiprocessor system having N clusters of processors;

determining a first thread count of active threads; and affinitizing the thread to a first clusters in the N clusters of processors according to the first thread count and the count threshold corresponding to number of threads assigned to the first clusters;

wherein the data causing the machine to perform determining a first thread count comprises data that, when executed by the machine, causes the machine to perform operations comprising:

determining a first thread count as a difference between a total thread count and a system thread count.

21. The article of manufacture of claim 20 wherein the data causing the machine to perform affinitizing comprises data that, when executed by the machine, causes the machine to perform operations comprising:

comparing the first thread count with the count threshold, the first thread count being associated with a current cluster;

selecting the first cluster being different than the current cluster if the first thread count exceeds the count threshold; and selecting the first cluster being the current cluster if the first thread count does not exceed the thread count threshold.

22. The article of manufacture of claim 21 wherein the data causing the machine to perform affinitizing further comprises data that, when executed by the machine, causes the machine to perform operations comprising:

updating the first thread count.

23. The article of manufacture of claim 21 wherein the data causing the machine to perform affinitizing further comprises data that, when executed by the machine, causes the machine to perform operations comprising:

resetting the first thread count if the first thread count exceeds the count threshold.

24. The article of manufacture of claim 20 wherein the data causing the machine to perform affinitizing further comprises data that, when executed by the machine, causes the machine to perform operations comprising:

determining an index pointing to the first cluster using the first thread count and the count threshold; and assigning the thread to the first cluster corresponding to the index.

25. The article of manufacture of claim 24 wherein the data causing the machine to perform determining an index comprises data that, when executed by the machine, causes the machine to perform operations comprising:

computing a ratio as a function of the first thread count and the count threshold; and converting the ratio into the index such that the index is within a range between 1 and N.

26. The article of manufacture of claim 25 wherein the data causing the machine to perform computing a ratio comprises data that, when executed by the machine, causes the machine to perform operations comprising:

adding a constant to the first thread count to produce a sum; and dividing the sum by the count threshold to produce the ratio.

27. The article of manufacture of claim 25 wherein the data causing the machine to perform converting the ratio comprises data that, when executed by the machine, causes the machine to perform operations comprising:

converting the ratio into the index using one of a modulo function and a look-up table.

28. The article of manufacture of claim 20 wherein the data causing the machine to perform obtaining a count threshold comprises data that, when executed by the machine, causes the machine to perform operations comprising:

obtaining a count threshold as one of a user input and a default setting.

29. The article of manufacture of claim 20 the data, when executed by the machine, further causes the machine to perform operations comprising:

receiving a request from an application to manage thread affinity.

30. The article of manufacture of claim 29 wherein the data causing the machine to perform receiving a request comprises data that, when executed by the machine, causes the machine to perform operations comprising:

receiving a request from an application to manage the thread affinity, the request specifying an affinity granularity.

31. The article of manufacture of claim 29 wherein the data causing the machine to perform affinitizing comprises data that, when executed by the machine, causes the machine to perform operations comprising:

receiving the request from the application to manage thread affinity via java™ virtual machine (JVM) command line.

32. The article of manufacture of claim 20 wherein the data causing the machine to perform obtaining a count threshold comprises data that, when executed by the machine, causes the machine to perform operations comprising:

obtaining a count threshold for thread affinity of a thread in a multiprocessor system having N clusters of processors, the N clusters of processors operating under an operating system, the thread being created by a virtual machine.

33. The article of manufacture of claim 20 wherein the data causing the machine to perform obtaining a count threshold comprises data that, when executed by the machine, causes the machine to perform operations comprising:

obtaining a count threshold for thread affinity of a thread in a cellular multiprocessor system having N clusters of processors.

34. The article of manufacture of claim 20 wherein the data causing the machine to perform obtaining a count threshold comprises data that, when executed by the machine, causes the machine to perform operations comprising:

obtaining a count threshold for thread affinity of a thread in a multiprocessor system having N clusters of processors, the N clusters of processors operating under an operating system, the thread being created by a Java™ virtual machine (JVM).

35. The article of manufacture of claim 20 wherein the data causing the machine to perform obtaining a count threshold comprises data that, when executed by the machine, causes the machine to perform operations comprising:

obtaining a count threshold for thread affinity of a thread in a multiprocessor system having N clusters of processors, the N clusters of processors operating under a Windows™ operating system, the thread being created by a virtual machine.

36. The article of manufacture of claim 20 wherein the data causing the machine to perform obtaining a count threshold comprises data that, when executed by the machine, causes the machine to perform operations comprising:

obtaining a count threshold for thread affinity of a thread in a multiprocessor system having N clusters of processors, each of the N clusters of processors having at least one processor.

37. The article of manufacture of claim 20 wherein the data causing the machine to perform obtaining a count threshold comprises data that, when executed by the machine, causes the machine to perform operations comprising:
affinitizing a Java™ thread to a first cluster in the N clusters of processors according to the first thread count and the count threshold.

38. An article of manufacture comprising:
a machine-accessible medium including data that, when accessed by a machine, causes the machine to perform operations comprising:
obtaining a count threshold for thread affinity of a thread in a multiprocessor system having N clusters of processors;
determining a first thread count of active threads; and
affinitizing the thread to a first clusters in the N clusters of processors according to the first thread count and the count threshold corresponding to number of threads assigned to the first clusters;
wherein the data causing the machine to perform affinitizing comprises data that, when executed by the machine, causes the machine to perform operation comprising:
creating an affinity mask to correspond to available clusters of processors; and
assigning the thread to the first cluster in the N clusters of processors using the affinity mask according to the first thread count and the count threshold.

39. A system comprising:
N clusters of processors; and
a memory coupled to a processor in the N clusters of processors, the memory containing program code that, when executed by the processor, causes the processor to:
obtain a count threshold for thread affinity of a thread in the N clusters of processors,
determine a first thread count of active threads, and
affinitize the thread to a first cluster in the N clusters of processors according to the first thread count and the count threshold, the count threshold corresponding to number of threads assigned to the first cluster;
wherein the program code causing the processor to determine the first thread count comprises program code that, when executed by the processor, causes the processor to:
determine the first thread count as a difference between a total thread count and a system thread count.

40. The system of claim 39 wherein the program code causing the processor to affinitize comprises program code that, when executed by the processor, causes the processor to:
compare the first thread count with the count threshold, the first thread count being associated with a current cluster;
select the first cluster being different than the current cluster if the first thread count exceeds the count threshold; and
select the first cluster being the current cluster if the first thread count does not exceed the thread count threshold.

41. The system of claim 40 wherein the program code causing the processor to affinitize comprises program code that, when executed by the processor, causes the processor to:
update the first thread count.

42. The system of claim 40 wherein the program code causing the processor to affinitize comprises program code that, when executed by the processor, causes the processor to:
reset the first thread count if the first thread count exceeds the count threshold.

43. The system of claim 39 wherein the program code causing the processor to affinitize comprises program code that, when executed by the processor, causes the processor to:
determine an index pointing to the first cluster using the first thread count and the count threshold; and
assign the thread to the first cluster corresponding to the index.

44. The system of claim 43 wherein the program code causing the processor to determine an index comprises program code that, when executed by the processor, causes the processor to:
compute a ratio as a function of the first thread count and the count threshold; and
convert the ratio into the index such that the index is within a range between 1 and N.

45. The system of claim 44 wherein the program code causing the processor to compute a ratio comprises program code that, when executed by the processor, causes the processor to:
add a constant to the first thread count to produce a sum; and
divide the sum by the count threshold to produce the ratio.

46. The system of claim 44 wherein the program code causing the processor to convert the ratio comprises program code that, when executed by the processor, causes the processor to:
convert the ratio into the index using one of a modulo function and a look-up table.

47. The system of claim 39 wherein the program code causing the processor to obtain a count threshold comprises program code that, when executed by the processor, causes the processor to:
obtain a count threshold as one of a user input and a default setting.

48. The system of claim 39 the program code further causes the processor to:
receive a request from an application to manage thread affinity.

49. The system of claim 48 wherein the program code causing the processor to receive a request comprises program code that, when executed by the processor, causes the processor to:
receive a request from an application to manage the thread affinity, the request specifying an affinity granularity.

50. The system of claim 48 wherein the program code causing the processor to receive the request comprises program code that, when executed by the processor, causes the processor to:
receive the request from the application to manage thread affinity via a Java™ virtual machine (JVM) command line.

51. The system of claim 39 wherein the program code causing the processor to obtain the count threshold comprises program code that, when executed by the processor, causes the processor to:

obtain the count threshold for thread affinity of a thread for the N clusters of processors, the N clusters of processors operating under an operating system, the thread being created by a virtual machine.

52. The system of claim 39 wherein the program code causing the processor to obtain the count threshold comprises program code that, when executed by the processor, causes the processor to:

obtain the count threshold for thread affinity of a thread in the N clusters of processors forming a cellular multiprocessor system.

53. The system of claim 39 wherein the program code causing the processor to obtain the count threshold comprises program code that, when executed by the processor, causes the processor to:

obtain the count threshold for thread affinity of a thread in the N clusters of processors, the N clusters of processors operating under an operating system, the thread being created by a Java™ virtual machine (JVM).

54. The system of claim 39 wherein the program code causing the processor to obtain the count threshold comprises program code that, when executed by the processor, causes the processor to:

obtain the count threshold for thread affinity of a thread in the N clusters of processors, the N clusters of processors operating under a Window™ operating system, the thread being created by a virtual machine.

55. The system of claim 39 wherein the program code causing the processor to obtain the count threshold comprises program code that, when executed by the processor, causes the processor to:

obtain the count threshold for thread affinity of a thread in the N clusters of processors, each of the N clusters of processors having at least one processor.

56. The system of claim 39 wherein the program code causing the processor to affinitize comprises program code that, when executed by the processor, causes the processor to:

affinitize a Java™ thread to a first cluster in to N clusters of processors according to the first thread count and the count threshold.

57. A system comprising:

N clusters of processors; and a memory coupled to a processor in the N clusters of processors, the memory containing program code that, when executed by the processor, causes the processor to:

obtain a count threshold for thread affinity of a thread in the N clusters of processors, determine a first thread count of active threads, and affinitize the thread to a first cluster in the N clusters of processors according to the first thread count and the count threshold, the count threshold corresponding to number of threads assigned to the first cluster;

wherein the program code causing the processor to affinitize comprises program code that, when executed by the processor, causes the processor to:

create an affinity mask to correspond to available clusters of processors; and assign the thread to the first cluster in the N clusters of processors using the affinity mask according to the first thread count and the count threshold.

* * * * *